US012350756B2

(12) United States Patent
De Chirico

(10) Patent No.: US 12,350,756 B2
(45) Date of Patent: Jul. 8, 2025

(54) LASER OPERATING MACHINE FOR ADDITIVE MANUFACTURING BY LASER THERMAL TREATMENT, IN PARTICULAR BY FUSION, AND CORRESPONDING METHOD

(71) Applicant: PRIMA INDUSTRIE S.p.A., Collegno (IT)

(72) Inventor: Michele De Chirico, Collegno (IT)

(73) Assignee: PRIMA INDUSTRIE S.P.A, Collegno (IT)

(*) Notice: Subject to any disclaimer, the term of this patent is extended or adjusted under 35 U.S.C. 154(b) by 419 days.

(21) Appl. No.: 16/341,651

(22) PCT Filed: Oct. 9, 2017

(86) PCT No.: PCT/IB2017/056213
§ 371 (c)(1),
(2) Date: Apr. 12, 2019

(87) PCT Pub. No.: WO2018/069809
PCT Pub. Date: Apr. 19, 2018

(65) Prior Publication Data
US 2019/0381566 A1 Dec. 19, 2019

(30) Foreign Application Priority Data
Oct. 14, 2016 (IT) .................. 102016000103343

(51) Int. Cl.
*B23K 26/082* (2014.01)
*B22F 10/25* (2021.01)
(Continued)

(52) U.S. Cl.
CPC ............ *B23K 26/144* (2015.10); *B22F 10/25* (2021.01); *B22F 10/362* (2021.01);
(Continued)

(58) Field of Classification Search
CPC .......... B22F 12/00; B22F 10/10; B22F 3/105; B22F 3/16; B22F 10/20; B22F 7/02;
(Continued)

(56) References Cited

U.S. PATENT DOCUMENTS 5,134,569 A * 7/1992 Masters ................. B29C 64/106
425/162
5,147,999 A * 9/1992 Dekumbis ............. B23K 26/324
219/121.63
(Continued)

FOREIGN PATENT DOCUMENTS

WO 2015/141335 9/2015
WO WO-2015141335 A1 * 9/2015 ............ B22F 3/1055
(Continued)

OTHER PUBLICATIONS

International Search Report and Written Opinion of the ISA for PCT/IB2017/056213, mailed Jan. 22, 2018, 13 pages.
Applicant's U.S. Appl. No. 16/341,243, filed Apr. 11, 2019.

*Primary Examiner* — Tiffany T Tran
(74) *Attorney, Agent, or Firm* — Nixon & Vanderhye P.C.

(57) ABSTRACT

A laser operating machine for additive manufacture of objects, via a process of laser thermal treatment of metal powders, in particular via fusion, comprising a movement structure (11), which is mobile in a working space (100) that comprises a working surface (110), said machine operating according to a first cartesian system of axes of movement (X, Y, Z) and being configured for supporting a moving element (12) comprising one or more nozzles (34) for emitting jets of powder to be treated thermally onto a working substrate (100, 110), and an optical laser assembly (20) for conveying a laser beam (L) to form a laser spot (S) focused on said working substrate (100, 110) in order to carry out thermal treatment of said powders. According to the invention, said moving element (12) comprises: an upper (Continued)

portion (12a) associated in a fixed way to said movement structure (11), said optical laser assembly (20) being set in said upper portion (12a); and a lower portion (12b), set in which is a tool-carrier frame (30), arranged on which are said one or more nozzles (34) for emitting jets of powder, and in that said nozzles (34) are arranged on said frame (30) so that longitudinal axes (U) thereof form an angle of inclination (β) with respect to said vertical axis (I) such that jets (PJ) of said nozzles (34) intersect in a powder-deposition point (PD), said machine (10) comprising actuator means for varying said angle of inclination (β) of said longitudinal axes (U) of said one or more nozzles (34); said optical laser assembly (20) being set in the moving element (12) so as to send the laser beam (L) onto the working surface (110) passing within perimeter defined by said plurality of nozzles (34) emitting jets of powder.

11 Claims, 10 Drawing Sheets

(51) Int. Cl.
| | | |
|---|---|---|
| | *B22F 10/362* | (2021.01) |
| | *B22F 10/364* | (2021.01) |
| | *B22F 10/366* | (2021.01) |
| | *B22F 12/00* | (2021.01) |
| | *B22F 12/55* | (2021.01) |
| | *B23K 26/02* | (2014.01) |
| | *B23K 26/08* | (2014.01) |
| | *B23K 26/144* | (2014.01) |
| | *B33Y 30/00* | (2015.01) |
| | *B33Y 70/00* | (2020.01) |
| | *B22F 12/13* | (2021.01) |
| | *B22F 12/49* | (2021.01) |
| | *B33Y 10/00* | (2015.01) |

(52) U.S. Cl.
CPC .......... *B22F 10/364* (2021.01); *B22F 10/366* (2021.01); *B22F 12/226* (2021.01); *B22F 12/55* (2021.01); *B23K 26/02* (2013.01); *B23K 26/082* (2015.10); *B23K 26/0884* (2013.01); *B33Y 30/00* (2014.12); *B33Y 70/00* (2014.12); *B22F 12/13* (2021.01); *B22F 12/49* (2021.01); *B33Y 10/00* (2014.12)

(58) Field of Classification Search
CPC ...... B22F 10/25; B22F 10/362; B22F 10/364; B22F 10/366; B22F 12/226; B22F 12/55; B23K 26/082; B23K 26/144; B23K 26/02; B23K 26/0884; B23K 26/32; B23K 26/324; B23K 26/342; B23K 26/00; B23K 2103/50; B23K 2103/52; B23K 26/0006; B23K 26/046; B23K 26/147; B23K 37/0235; B33Y 10/00; B33Y 30/00; B33Y 70/00; B29C 67/00; B29C 64/153; B29C 64/188; B29C 64/209; B29C 64/268; B29C 64/295; Y02P 10/25
See application file for complete search history.

(56) References Cited

U.S. PATENT DOCUMENTS

| | | | | |
|---|---|---|---|---|
| 6,111,214 | A * | 8/2000 | Saito | B23K 26/147 |
| | | | | 219/121.72 |
| 6,459,069 | B1 * | 10/2002 | Rabinovich | B28B 1/001 |
| | | | | 219/121.63 |
| 2011/0089151 | A1 | 4/2011 | Miyagi et al. | |
| 2016/0311027 | A1 | 10/2016 | Shimoyama | |
| 2017/0050268 | A1 | 2/2017 | Fujiya et al. | |

FOREIGN PATENT DOCUMENTS

| | | | | |
|---|---|---|---|---|
| WO | 2015/181772 | | 12/2015 | |
| WO | WO-2015181772 A1 * | 12/2015 | | B22F 10/20 |
| WO | 2016/151781 A1 | | 9/2016 | |

* cited by examiner

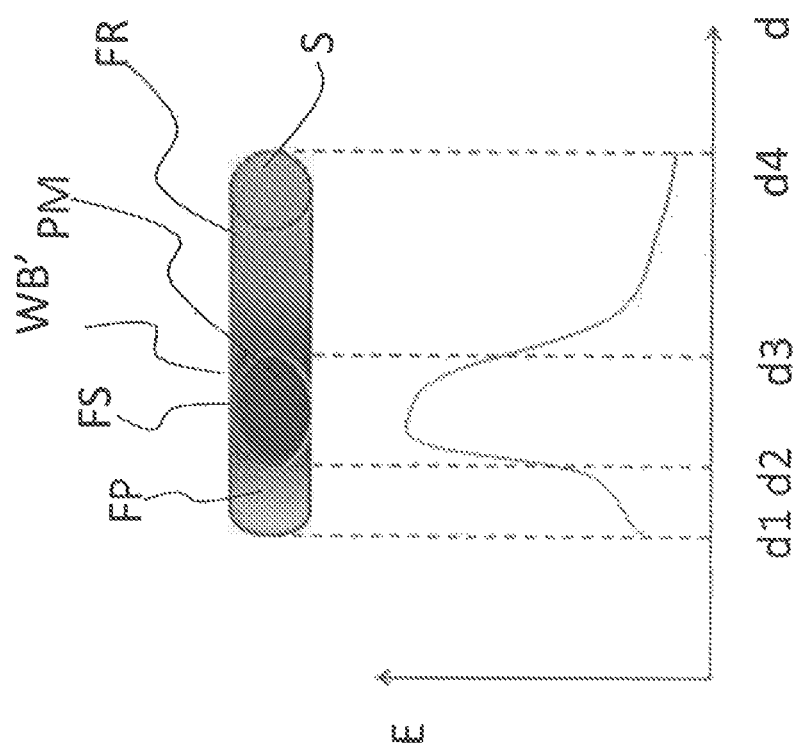

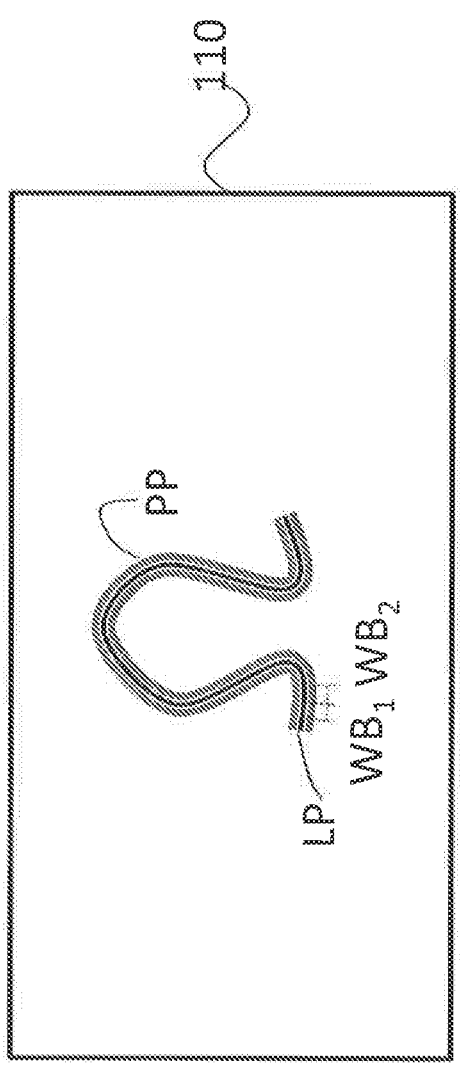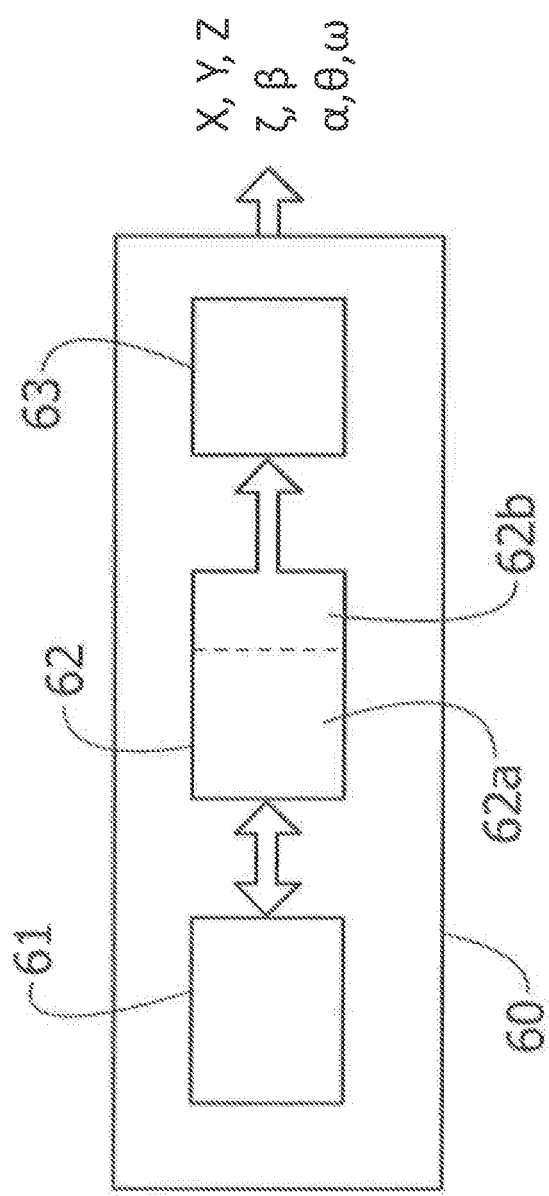

LASER OPERATING MACHINE FOR ADDITIVE MANUFACTURING BY LASER THERMAL TREATMENT, IN PARTICULAR BY FUSION, AND CORRESPONDING METHOD

This application is the U.S. national phase of International Application No. PCT/IB2017/056213 filed 9 Oct. 2017, which designated the U.S. and claims priority to IT Patent Applications No. 102016000103343 filed 14 Oct. 2016, the entire contents of each of which are hereby incorporated by reference.

TECHNICAL FIELD

The present disclosure relates to a laser operating machine for additive manufacture of objects via a process of laser thermal treatment of metal powders, in particular via fusion, comprising a movement structure, which is mobile in a working space that comprises a working surface, said machine operating according to a first cartesian system of movement axes and being configured for supporting a moving element that comprises one or more nozzles for emitting jets of powder to be treated thermally, a working substrate, and an optical laser assembly for conveying a laser beam to form a laser spot focused on said working substrate in order to carry out thermal treatment on said powders.

Various embodiments may be applied to thermal control of the fusion profile in fusion processes and to orienting of the nozzles in order to avoid obstacles and vary parameters of the powder-deposition point.

TECHNOLOGICAL BACKGROUND

The process of additive manufacturing by laser fusion consists in deposition of successive layers of metal powders to be treated thermally, via fusion or else via a similar thermal treatment at high temperature such as sintering, so as to form complex geometrical shapes. Various manufacturing sectors, such as the automotive sector and the aerospace sector, are taking into consideration these processes for the production of complex objects of large dimensions made of metal or metal alloys. The growth techniques currently used, in particular those entailing deposition of metal powders and subsequent laser fusion, present limits as regards the characteristics of the objects produced (non-uniformity, porosity, presence of microfractures that alter the characteristics of strength, etc.).

Metal-powder deposition technology is an evolution of the technology used for metal cladding. A cladding nozzle aligned to the beam of a laser machine supplies the jet of metal powder necessary for fusion.

In the above process of fusion of metal powders, uncontrolled temperature gradients that set up between the zone where fusion has already been carried out (post-heating phase), the temperature of which is decreasing with respect to a fusion temperature, the zone where fusion is being carried out (fusion phase), which is at the fusion temperature, and the zone where fusion is still to be carried out (pre-heating phase), which is once again at a temperature lower than the fusion temperature, may cause a poorer quality of deposition in terms of uniformity and porosity, but above all formation of microfractures and cracks caused by uncontrolled relief of the stresses generated in the process. In general, the additive-manufacturing process, by bringing the material in the melt pool to fusion, determines a phase change (fusion) in the state of the material. Generally, the molten phase has a greater volume than the solid phase so that in the solidification step there is a contraction of the material, which determines, among other things, the onset of strains and stresses. When these stresses are no longer withstood by the material, fractures and consequent cracks are generated. The consequences may hence be both of an aesthetic type and of a structural type (greater brittleness, deviation from the characteristics set down in the design stage).

The pre-heating and post-heating treatments have the purpose of enabling the material to relieve the stresses so as to reduce the internal stresses (and hence the strains), as well as to prevent fractures. A control of the energy profile applied to the pre-heating, fusion, and post-heating phases in order to minimise these temperature gradients hence improves the quality of the process. However, this control, which may be obtained via profiles of variation of the parameters of direction, focusing, and power of the laser fusion beam is difficult to implement in known machines. Known from the Italian patent application No. 102014902266229 filed in the name of the present applicant is an additive-manufacturing machine that uses a nozzle frame, enabling passage of the laser beam inside it. The laser beam can hence be displaced within the frame, enabling different modalities of use and energy profiles. However, the freedom of setting the energy profiles of the laser beam with respect to the pre-heating and post-heating zones is limited by the presence of the frame and the nozzles, which does not allow orientation of the laser beam in every position. There may be interference both with the nozzle and with the jet of powder. Moreover, this type of limitation means that the relative position and orientation between the deposition path and the nozzles change as a function on the position along the path itself, and this may affect the deposition itself, in terms of quantity and quality.

Risks of interception of the nozzles may of course also derive from other types of thermal-treatment process and of control of the paths, in addition to the pre-heating and post-heating treatments described herein.

OBJECT AND SUMMARY

The embodiments described herein have the purpose of improving the methods and systems according to the prior art, as discussed previously.

Various embodiments achieve the above object thanks to a laser operating machine for additive manufacture of objects via laser thermal treatment of metal powders, in particular via fusion, the machine having the characteristics recalled in the ensuing claims.

Various embodiments also refer to a corresponding method for additive manufacture of objects via laser thermal treatment of metal powders, in particular via fusion.

The claims form an integral part of the technical teachings provided herein in relation to the invention.

BRIEF DESCRIPTION OF THE FIGURES

Various embodiments will now be described, purely by way of example, with reference to the annexed drawings, wherein:

FIG. 9 represents a second type of working segment performed by the operating machine of FIG. 1;

FIG. 10 represents working paths followed by the operating machine of FIG. 1; and FIG. 11 represents a control architecture of the operating machine described herein.

DETAILED DESCRIPTION

In the ensuing description numerous specific details are illustrated in order to enable maximum understanding of the embodiments provided by way of example. The embodiments may be implemented with or without specific details, or else with other processes, components, materials, etc. In other circumstances, structures, materials, or operations that are well known are not shown or described in detail so that various aspects of the embodiments will not be obscured. Reference, in the course of the present description, to "an embodiment" or "one embodiment" indicates that a particular feature, structure, or characteristic described in connection with the embodiment is comprised in at least one embodiment. Hence, phrases such as "in an embodiment" or "in one embodiment" that may be present in various points of the present description do not necessarily refer to one and the same embodiment. Moreover, the particular features, structures, or characteristics may be combined in any convenient way in one or more embodiments.

The terms and references are provided herein merely for convenience of the reader and do not define the sphere of protection or the scope of the embodiments.

In brief, the laser operating machine proposed comprises a movement structure, which is mobile in a working space that comprises a working surface, the machine operating according to a first cartesian system of movement axes and being configured for supporting a moving element that comprises one or more nozzles for emitting jets of powder to be treated thermally, in particular via fusion, onto a working substrate, and an optical laser assembly for conveying a laser beam to form a laser spot focused on said working substrate in order to carry out thermal treatment of said powders, in particular fuse them, wherein the moving element comprises: an upper portion fixedly associated to the movement structure, the optical laser assembly being set in the upper portion; and a lower portion, which is rotatable about an axis parallel to a vertical axis of the first system of cartesian axes, set in which is a tool-carrier frame, on which said one or more nozzles for emitting jets of powder are arranged, the optical laser assembly being set in the moving element so as to direct the laser beam onto the working surface passing within a perimeter defined by the aforesaid plurality of nozzles for emitting jets of powder.

Figure 1:
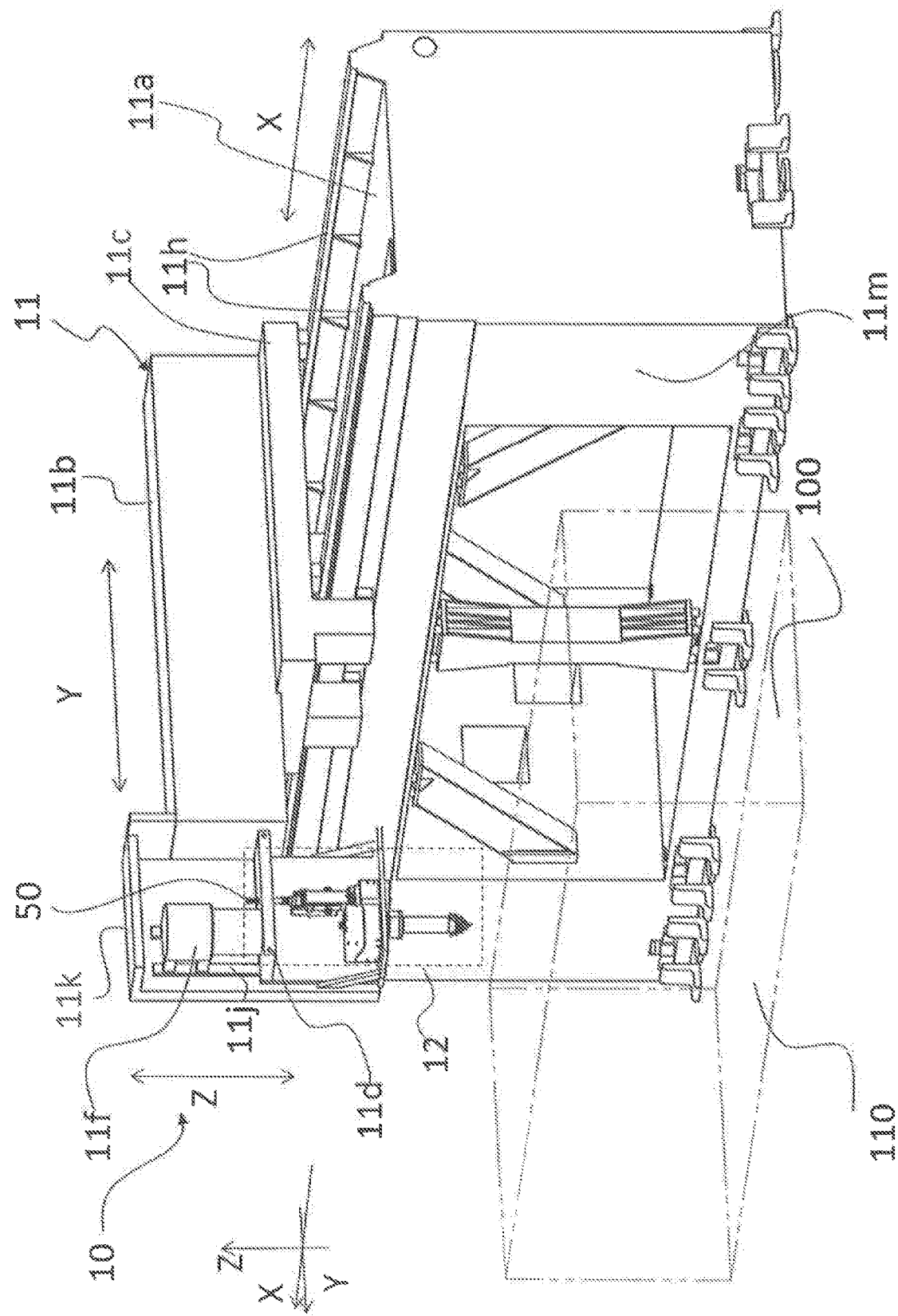
FIG. 1 is a schematic perspective view of a laser operating machine.

Consequently, FIG. 1 is a schematic perspective view of an embodiment of the laser operating machine, designated as a whole by the reference number 10, which comprises a movement structure 11, designed to displace a support 11d, fixedly associated to which is a moving element 12, which can move along a first plurality of axes, specifically three cartesian axes X, Y, Z.

For this purpose, the movement structure 11 comprises a guide structure 11a, which in turn comprises a base 11m and, on the top part, rails 11h, which extend along the horizontal axis X. Located on the rails 11h is a slide 11c, which is free to slide in the direction of the axis X. Resting on the slide 11c is one end of a cantilever beam 11b that extends in a horizontal direction, along the axis Y, orthogonal to the axis X. The above end of the beam 11b is set in cantilever fashion and is associated, in a slidable way along the axis Y, to the slide 11c, on which it rests. The other free end of the beam 11b has a support 11k with vertical guide 11j, along which the support 11d that carries the moving element 12 slides, driven by a motor 11f, along the axis Z orthogonal to the plane XY, and hence vertical.

Movement of the beam 11b with respect to the slide 11c and movement of the slide 11c with respect to the guide structure 11a are also obtained via motors, which are not, however, shown in FIG. 1.

As illustrated in FIG. 1, as a result of the above configuration, displacement of the moving element occurs within a working space 100, basically a parallelepiped, the dimensions of which are defined by the travel of the moving element 12 along the horizontal axes X and Y, and the vertical axis Z. Moreover designated by 110 in FIG. 1 is a working surface that basically corresponds to the bottom face of the working space 100. This working surface 110 is the surface, or working substrate, starting from which, as described in what follows, the sections of an object to be obtained are treated thermally in an additive way at high temperatures, specifically, in the preferred example described herein, by fusion. In variant embodiments, the thermal treatment may be sintering. It should be noted that in variant embodiments, on the working surface 110, understood as the plane surface, for example of a workbench, a substrate is present on which the powders are deposited and fusion is carried out, or else an element on which a metal structure is grown via the additive process described herein. Hence, in general by "working surface" is meant the surface at the height at which the process is carried out, namely, the surface either of the substrate where the powders are deposited or of the element on which additive growth is carried out.

Alternatively, the movement structure 11 may, for example, be of the portal type.

The moving element 12, as better illustrated in what follows, comprises an optical laser assembly 20 and nozzles 34 for injecting powder to be fused. Consequently, the machine 10 includes, for example, a catenary, not shown in FIG. 1, which comprises optical-fibre cables, which connect up in particular to a wiring 50 of the moving element 12, for conveying the radiation originating from a laser-radiation source, which is located remote from the moving element 12, to the components in the moving element 12 and into an optical laser assembly 20, shown in FIG. 3, which comprises an adaptive-collimation device and an optical scanner. In various embodiments, the moving element 12 may include the laser source itself.

The aforesaid catenary may possibly also deliver supporting gas, such as argon or nitrogen, for the fusion process. The catenary comprises ducts for delivering the fusion powders from respective supply devices set remote with respect to the machine 10. Moreover, the catenary comprises electrical control cables and possible coolant-delivery pipes.

Figure 2:
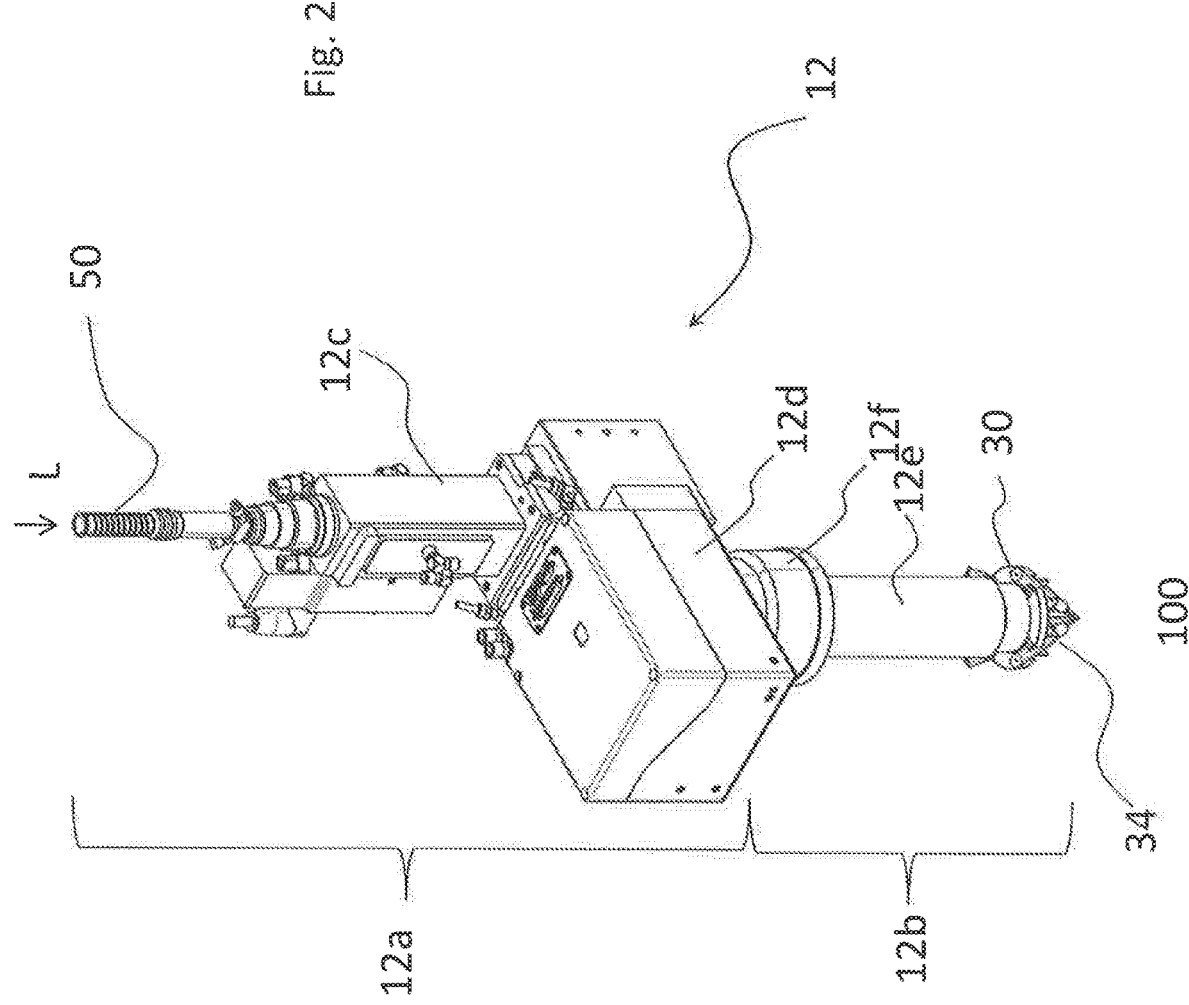
FIG. 2 is a perspective view of a moving element of the machine of FIG. 1.

The moving element 12 is represented in FIG. 2 in perspective view at an enlarged scale. The moving element 12 comprises an upper portion 12a, which substantially houses the optical laser assembly 20. Connected, in fact, to the upper portion 12a is the wiring 50, which comprises inside it an optical fibre that carries a laser beam L emitted by a laser source set remote, and hence not shown in FIG. 2.

The wiring 50 enters a box-shaped body 12c, which is set on the top wall of a further box-shaped body 12d.

Figure 3:
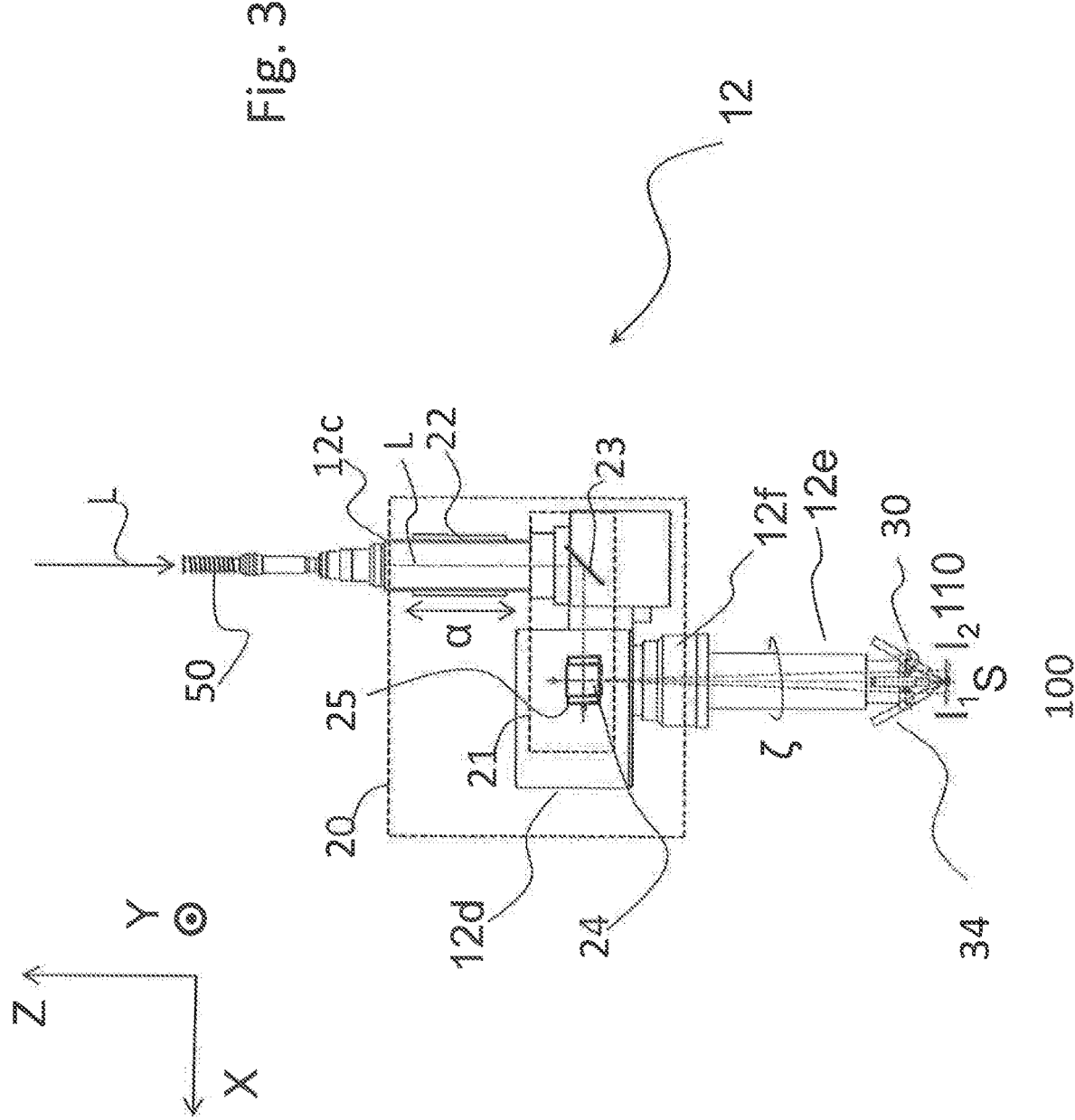
FIG. 3 is a lateral view of the moving element of FIG. 2.

The box-shaped body 12c, as may be seen more clearly in FIG. 3, which shows the moving element 12 in lateral view and with some optical components rendered visible, houses an adaptive-collimation device 22, which receives the laser beam L along an axis parallel to the vertical axis Z.

The box-shaped body 12d houses optical-scanning means 21, which orient the laser beam L at output from the upper portion 12a.

The moving element 12 then comprises a lower portion 12b, set underneath the upper portion 12a and associated thereto, in particular associated, via a roof wall thereof, to a bottom wall of the box-shaped body 12d that houses the optical-scanning means 21.

The lower portion 12b comprises a duct 12e that passes through it, the main axis of which is parallel to the vertical axis Z, but staggered in the horizontal plane XY with respect to the axis of the adaptive-collimation device 22. The duct 12e, which is preferably pressurized, has a tubular shape and is associated, at an open end thereof, to the box-shaped body 12b through a rotary driving system 12f, associated to driving motors (not shown in the figure), which enables rotation of the duct 12e about its own main axis.

The other end of the duct 12e, which is open—at least from an optical standpoint in so far as, to maintain pressurization, there may be set a fluid-tight closing element transparent to the wavelength of the laser radiation—and gives out onto the working area 100, is connected in a fixed way to an end tool represented by a plurality of nozzles 34 for emitting powder to be fused which are mounted on a tool-carrier frame 30. The tool-carrier frame 30 is fixedly associated to the above open end of the duct 12e.

Figure 5:
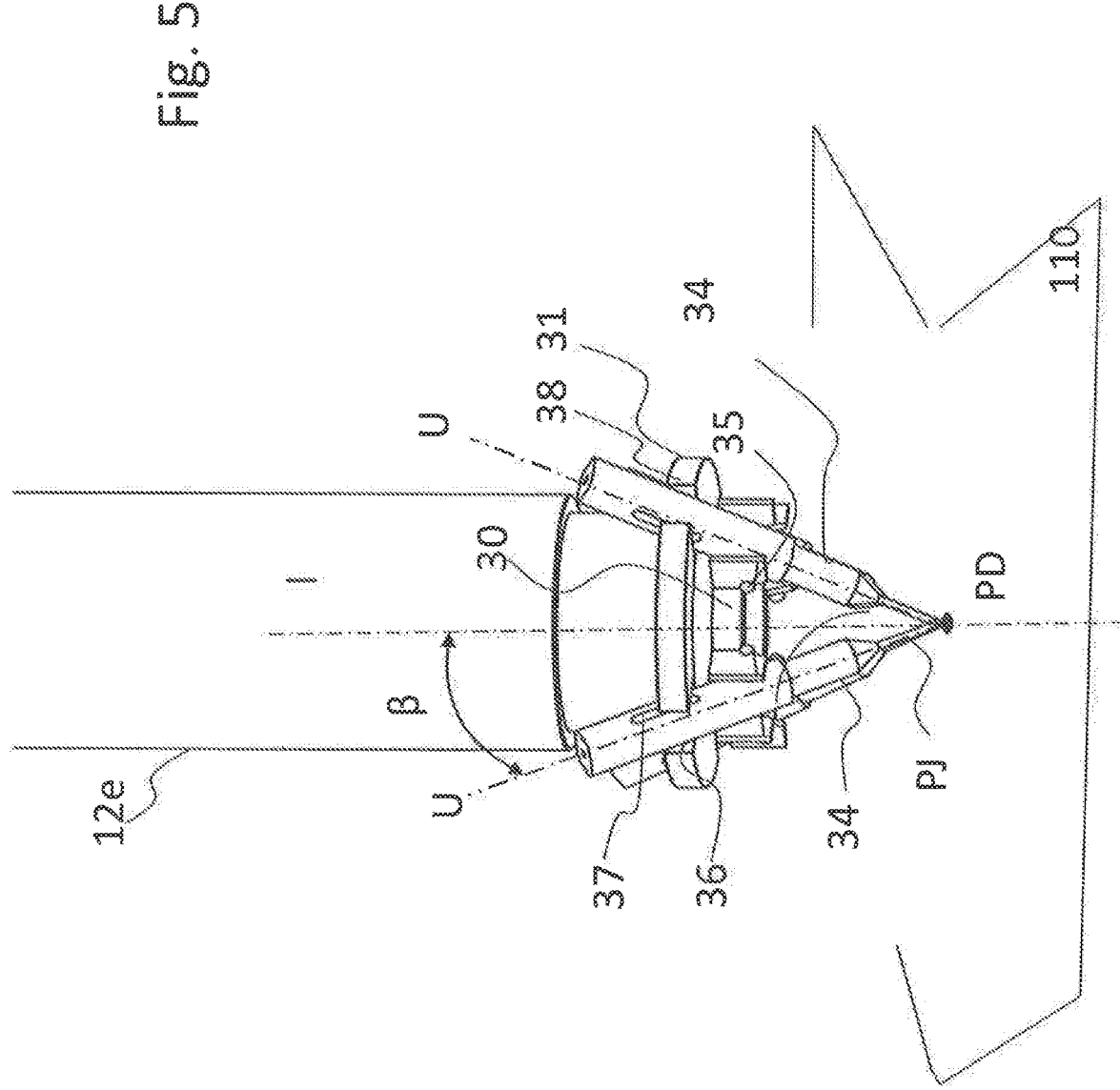
FIG. 5 is a perspective view of a detail of the lower portion of the moving element of FIG. 2.

As may be seen more clearly in FIG. 5, which shows a perspective view of the terminal part of the duct 12e, once again rendering visible the optical components contained therein, and of the tool-carrier frame 30, the latter has the shape of a circular ring so that it defines a perimeter that has accordingly the shape of a circumference identifying an circular area of passage inside it. The nozzles 34, in the example described herein, are four in number, each set at an angle of 90° from the adjacent ones along the circumference of the tool-carrier frame 30. The tool-carrier frame 30 is positioned parallel to the working surface 110, i.e., its perimeter and its area are parallel to the plane XY.

The nozzles 34 are preferably arranged, with respect to a vertical axis parallel to the axis Z that joins the ring of the frame 30 to the working surface 110, with longitudinal nozzle emission axes U of their own inclined towards an injection axis I that passes through the centre of the circumference defined by the frame 30, forming, that is, an acute angle of inclination β, with the axis I so that the nozzle axes U intersect in a powder-deposition point PD. According to a preferred embodiment, one or more of the above nozzles 34 is a nozzle for spraying supporting gas. According to another preferred embodiment, one or more of the nozzles 34 is a nozzle for spraying powders to be fused that are surrounded by a protecting gas.

Figure 4:
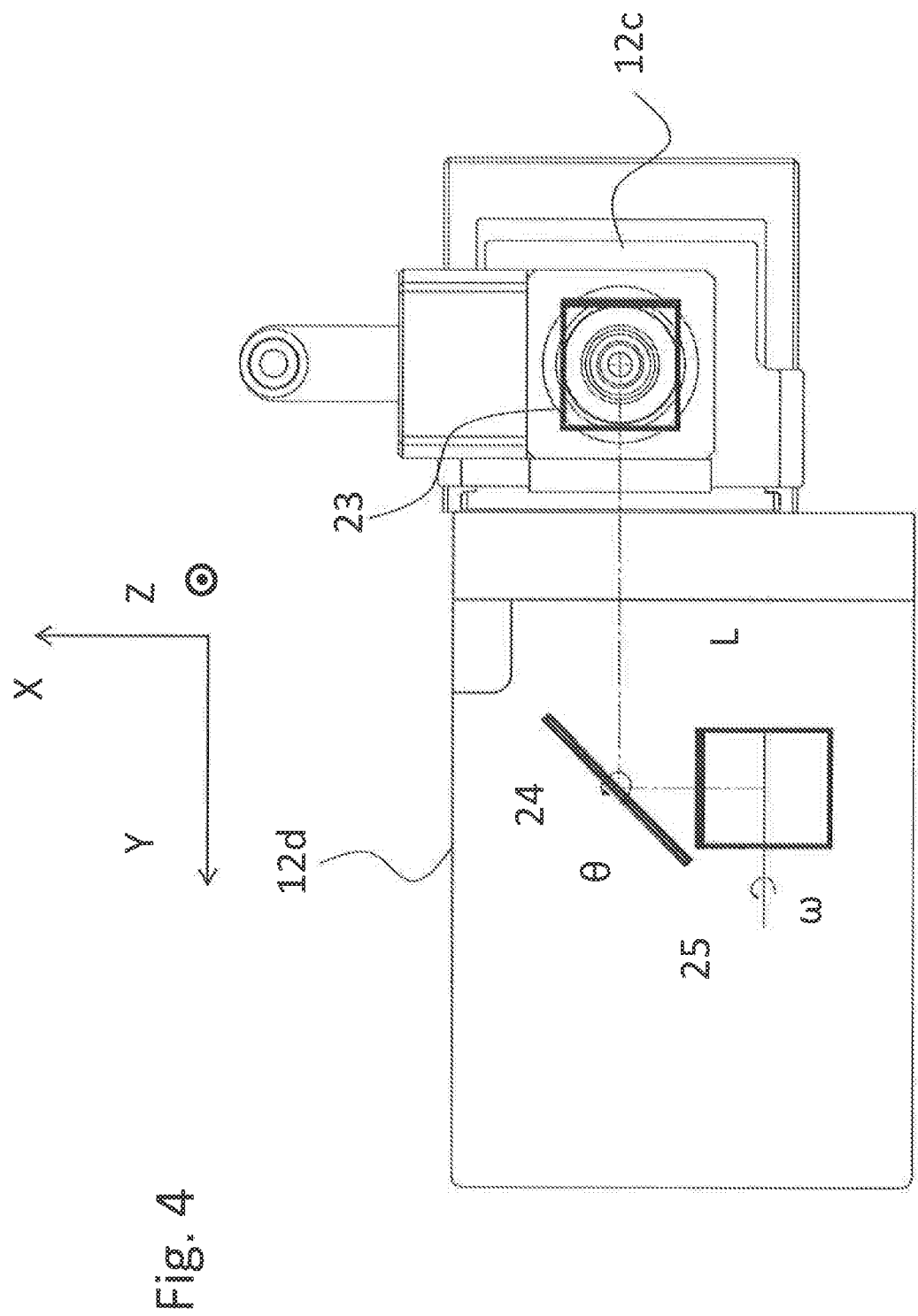
FIG. 4 is a top plan view of the moving element of FIG. 2.

As has been mentioned, FIGS. 3 and 4 show a lateral view and a top plan view, respectively, of the moving element 12 and of the optical laser assembly 20, where the optical components within the upper portion 12a and the lower portion 12b are highlighted.

In the lateral view of FIG. 3, where the axis X points in a direction coming out of the plane of the figure, it may be noted how the box-shaped body 12d comprises inside it the optical scanner 21, which conveys and focuses a laser radiation L to form a laser spot S in the working space 100, the laser radiation L coming out of an adaptive-collimation element 22 that enables variation of the diameter and focusing point of said laser spot S starting from a laser radiation, with characteristics of power suitable for fusion, which is conveyed by a remote laser source through the optical fibre in the wiring 50, or alternatively, via an optical chain or a laser-radiation source co-located in the moving element 12. Downstream of the adaptive collimator 22, along a vertical axis of propagation of the laser radiation L, a stationary mirror 23 deflects the laser radiation L perpendicularly, i.e., in a horizontal direction. The mirror 23 preferably has characteristics of frequency selectiveness, i.e., is, for example, a dichroic mirror, so as to carry out monitoring of the non-reflected radiation, coming from the source or from the working area 110. In particular, the reflected radiation generated by the melt pool (designated by PM in FIG. 8A) during processing follows the optical path backwards. The dichroic mirror selects some frequencies, allowing itself to be traversed thereby, and sends them towards a monitoring element or system (not shown). The optical scanner 21 is constituted by two mobile orienting mirrors 24 and 25, which are driven via respective galvanometric actuators (not shown in the figure) for obtaining rotation of the two mirrors, and hence of the laser beam L deflected thereby, along two mutually perpendicular axes of rotation, i.e., a first axis of rotation θ corresponding to the rotation along the longitudinal axis of the mirror 24, and a second axis of rotation ω for the mirror 25 perpendicular to the mirror 24 and parallel to the axis X, as may be seen in FIG. 4. By moving the orienting mirrors 24 and 25 along the above axes, it is possible to displace the beam, with respect to a normal axis of incidence I of the laser radiation L, for example as far as limit directions I1, I2 (axis ω) shown in FIG. 3. Corresponding limit directions may be identified with for the axis θ, so that in this way the laser beam L is displaced within a conical space defined by the aforesaid limit directions, and the laser spot S is displaced over the working surface 110 in the directions X and Y. Since the laser spot S, as a result of the axes of rotation θ and ω, would move more precisely along a spherical cap, via the control action of the adaptive-collimation element 22 it is possible to compensate therefor by displacing the focusing point (linear displacement α), i.e., the laser spot S, so as to obtain displacements thereof on a plane surface. It is clear that the adaptive-collimation element 22 moreover enables displacement of the focused laser spot S along the axis Z also in a way independent of the effect of the axes of rotation θ and ω.

Moreover visible in the view of FIG. 3 is the frame 30 that carries the nozzles 34 and the pressurized duct 12e within which the laser beam L passes. The aforesaid frame 30, as has been mentioned, is moved according to a rotation about the vertical frame axis ζ, parallel to the axis Z, and through the centre of the circumference defined by the nozzles 34, via an actuator (not shown in the figure). In general, the frame axis ζ coincides with the normal axis of incidence I. In the embodiment provided by way of example, the pressurized duct 12e is fixed with respect to the frame 30, and the duct 12e and the frame 30 rotate fixedly with respect to the upper portion 12a, which, instead, is fixed with respect to the support 11d; i.e., it is mobile only along the first plurality of axes of movement X, Y, Z of the movement system 11. This means that also the optical assembly 20 is mobile only along the first plurality of axes of movement X, Y, Z of the movement system 11. In an alternative embodiment, the pressurized duct 12e is fixed with respect to the upper portion 12a, whereas the frame 30 is associated to the bottom end of the duct 12e in a rotatable way about the longitudinal axis of the duct 12e, which corresponds to the main, vertical, axis of inertia of the frame, if understood as disk or ring. Actuation means may, in this case, be arranged within the duct 12 for rotating the frame 30.

According to a further aspect of the solution described herein, the longitudinal axes U of the nozzles 34, which correspond to the direction of injection of the powder, may vary their own angle of inclination β, via the action of respective kinematic mechanisms and actuators. The embodiment shown in FIG. 5 provides that the variation of the inclination of the nozzles 34 is carried out via a kinematic mechanism that comprises two frames.

A first frame is represented by the frame 30, to which the nozzles 34 are fixed in a rotatable way through rotation pins 35. In particular, the rotation pins 35 are fixed on the frame 30 so as to be able to rotate about an axis substantially tangential to the perimeter of the frame 30 so as to vary only the angle of inclination β with respect to the axis I. The rotation pins 35 are fixed to the nozzles 34 in a position for example half-way along their length, to the frame 30. The nozzles 34 moreover comprise through slots 37 of oblong shape, the main axis of which is aligned to the nozzle axis U, in such a way as to allow a pin 36 that slides in a respective slot 37 to displace along the axis U of the nozzle 34.

A second frame 31, once again circular and with a diameter larger than that of the frame 30, is set above the frame 30 in a concentric way. The second frame 31 comprises, on its outer perimeter, seats 38, i.e., notches along the perimeter, for housing the nozzles 34. Arranged in the notches 38 are the pins 36, in such a way that also these are able to rotate about an axis substantially tangential to the perimeter of the second frame 31. Since the pins 36 engage the slots 37 of respective nozzles 34, moving, along a vertical axis, the second frame 31 with respect to the frame 30, via a respective motor-driven actuator (not visible in the figures), sliding of the pins 36 in the slot 37 is brought about, with simultaneous variation of the angle of inclination β of the nozzles 34, as may be seen in FIGS. 7A and 7B.

Figure 7A:
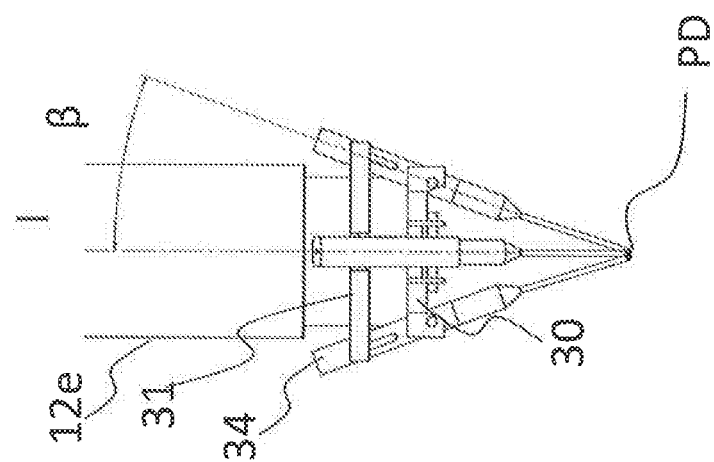
FIGS. 7A and 7B show the detail of FIG. 5 in two different operating positions.
Figure 7B:
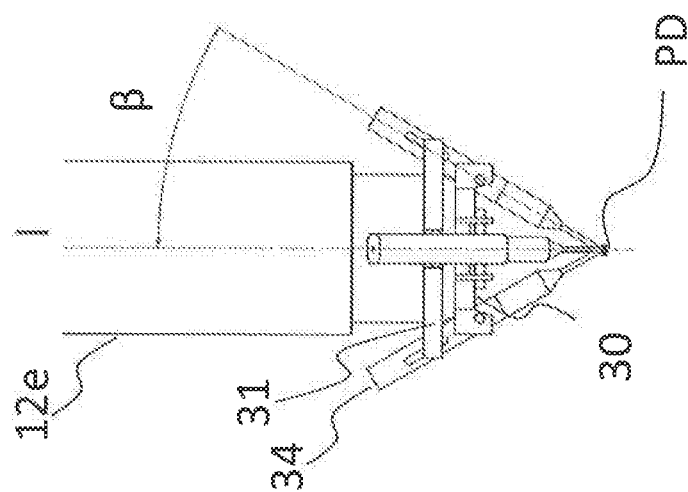

In particular, in FIG. 7A the second frame 31 is in a lowered position, thus determining a wider angle of inclination β, namely, of 30°. The bottom end parts of the nozzles 34 are closer to one another in the horizontal plane XY, leaving a passage of smaller area for the laser beam L, and the jets of powder PJ meet in a powder-deposition point PD closer to the frame 30 and of smaller size. In fact, the jet of powder PJ is not perfectly cylindrical, but has a conical shape at outlet from the nozzle 34, so that, the further away from the frame 30 the jets meet, the larger the diameter of the powder spot, corresponding to the powder-deposition point PD, that is formed and defined by the jets. It should be noted that reference is made herein to "powder-deposition point PD", but the latter has an area with a size that, as has just been said, may be varied. By increasing both the dimension of the powder spot and the powder flowrate, jointly with an increase of the diameter of the laser beam, it is possible to increase the capacity of deposition in time, i.e., throughput. Instead, by reducing the dimensions of the powder spot, the laser spot, and the powder flowrate, the precision of the process and the surface quality of the product is improved, clearly at the expense of throughput. The overall solution hence enables process flexibility and adaptability according to the requirements of the end product. In FIG. 7B, the second frame 31 has been brought into a higher position, thus causing rotation of the nozzles 34 about the respective pins 35 and 36 and determining a smaller angle of inclination β, namely an angle of 20°. The bottom end parts of the nozzles 34 are further away from one another in the horizontal plane XY, leaving a passage of larger area for the laser beam L, and the jets of powder PJ meet in a powder-deposition point PD further away from the frame 30.

It is clear that various embodiments are possible for the kinematic mechanism that varies the angle of inclination β. In a simplified embodiment, for example, just the frame 30 is present, which causes rotation, via respective actuators, of the pins 35, once again arranged according to axes tangential to the perimeter of the frame 30 so that the nozzles 34 rotate only about the axis of the pins 35.

Figure 6:
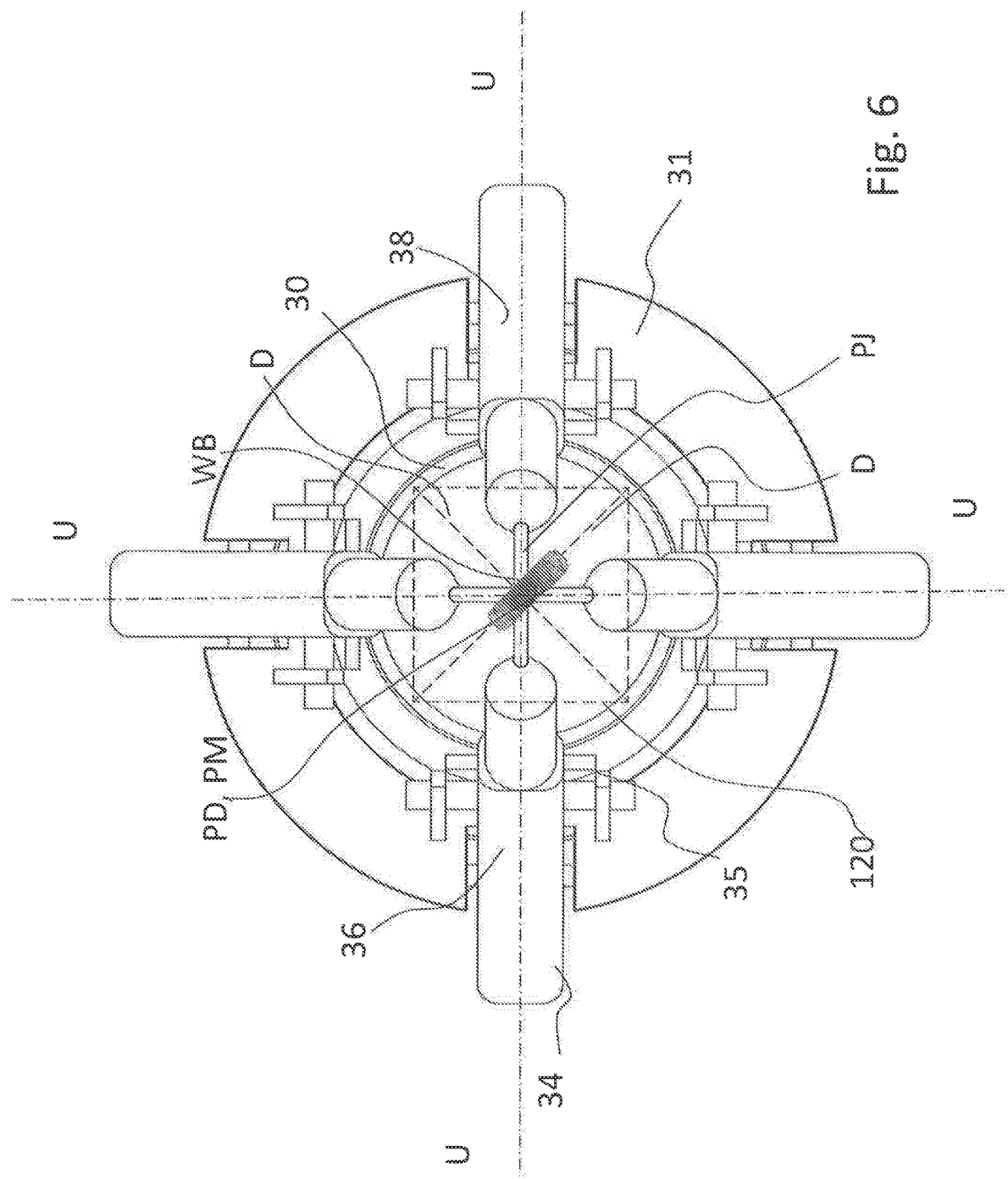
FIG. 6 is a plan view from beneath of the detail of FIG. 5.

FIG. 6 is a plan view from beneath of the kinematic mechanism that comprises the frames 30 and 31, where the positions of the pins 35 and 36 may be better appreciated. Appearing between the bottom end parts of the nozzles 34, on the prolongation of the respective nozzle axes U, is the powder-deposition point, or spot, PD.

Hence, the system described so far enables movements on the nozzles 34 to be carried out, in particular a rotation thereof about the axis Z and a variation of their angle of inclination β with respect to the normal axis of incidence I, which enable displacements of the nozzles 34 additional to those imposed by the movement system 11.

The possibility of inclining the nozzles 34 and hence the powder-deposition jets PJ is used not only to prevent interference with the laser beam, but also to avoid obstacles present in the working space, such as tools on which the workpiece is growing or parts that have already grown, to vary the shape of the powder spot and to vary the height of the powder-deposition point PD in order to make corrections, for example according to a closed-loop control, with respect to the commands imparted by a so-called part program, or set of instructions, as described more fully in what follows.

FIG. 6 moreover shows, with a dashed line in so far as it lies in the plane of the working surface 110, a substantially square working area 120, which is inscribed within the frame 30. Defined therein are segments WB of a working path, i.e., segments followed by the laser spot S in order to carry out the phases of fusion, pre-heating, and post-heating, as described more fully in what follows with reference to FIG. 8.

As may be seen, denoted by WB in FIG. 6 is a working segment, aligned in a direction of advance D, with respect to which the projection of the nozzle axes U in the plane of the working surface 110 is set at 45°. When the nozzles 34 are arranged in this way with respect to the working segments WB, there is no possibility of the spot S encountering either the powder jets or the nozzles 34 that emit the jets. Also indicated in the figure is a second direction of advance D orthogonal to the first, with which the nozzle axes U form an angle of 45° also.

The machine described so far hence enables improvement of the control of the energy profiles applied in the three phases of pre-heating, fusion, and post-heating.

Figures 8A, 8B:
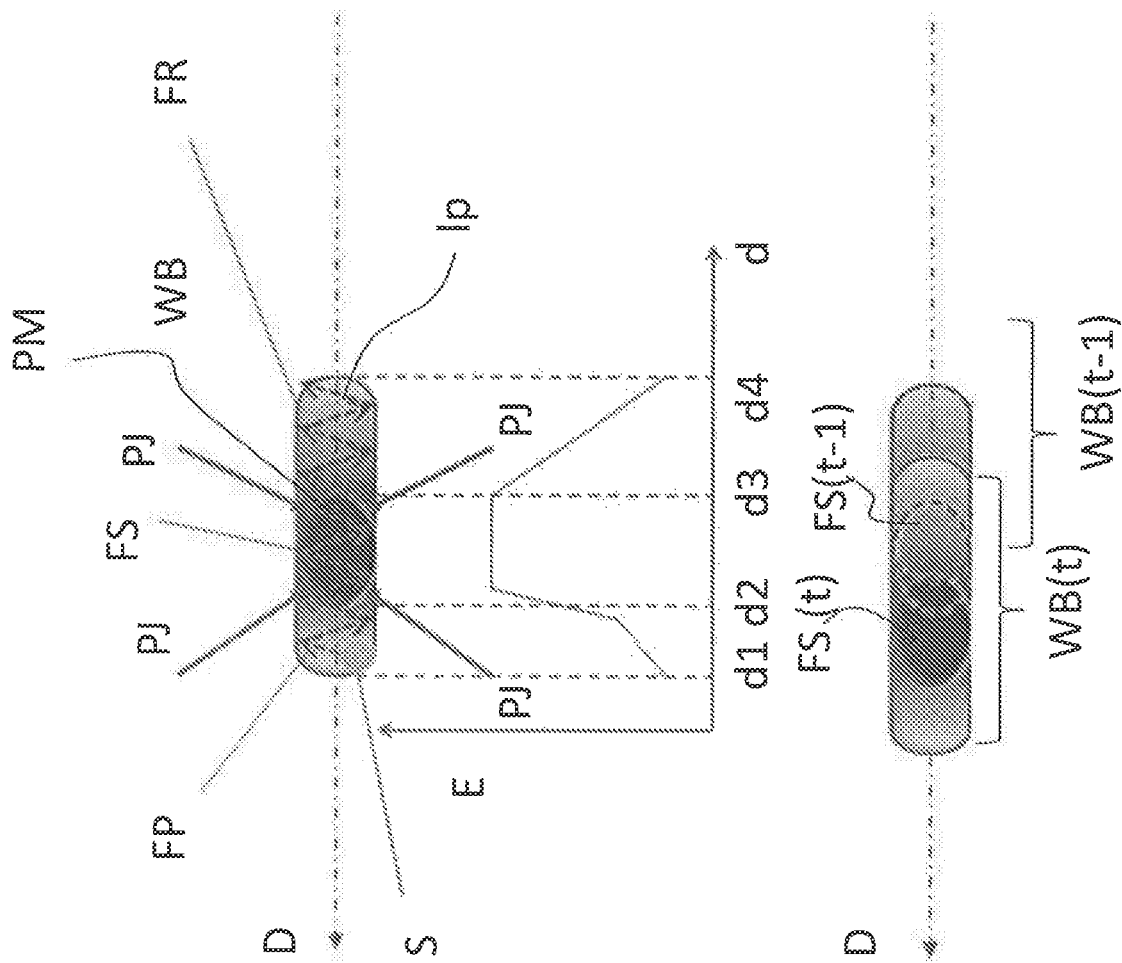
FIGS. 8A and 8B represent a first type of working segment performed by the operating machine of FIG. 1.

Illustrated in FIG. 8A is a working segment WB, in which the laser beam L (i.e., its spot S) controlled by the optical assembly 20 describes a zigzag internal laser trajectory lp. By "internal laser trajectory lp" is here meant a trajectory described by the laser spot S within the working segment WB. The working segment WB then corresponds to a segment of a laser fusion path LP, as described more fully with reference to FIG. 10. The internal laser trajectory lp may be a zigzag path, as in FIG. 8A, or a path that follows the working segment, as in FIG. 9. In general, the internal laser trajectory lp, where by "trajectory" is meant the kinematic co-ordinates that describe in time the motion of the laser spot S, in order to carry out, in addition to fusion, pre-heating, and post-heating, moves in time backwards and forwards along the path of the trajectory.

In FIG. 8A, the working segment WB is associated to a direction of advance D of the moving element 12, which lies in the plane of the working surface 110 and is the direction in which a melt pool PM of deposition of the molten material progresses. Defined along the above working segment WB is a position d along the working segment WB. As may be seen in FIG. 8A, also represented is a diagram that plots a working energy E, i.e., the energy associated to the laser spot S, as a function of the position d. The axis of the position d is aligned to the direction of advance D of the segment WB, so that it is possible to indicate on the axis of the position d positions d1, d2, d3, d4, defined between which are the phases of pre-heating FP (interval d1-d2), fusion FS (interval d2-d3), and post-heating FR (interval d3-d4).

Illustrated schematically in FIG. 8A are the four jets of powder PJ, aligned to the nozzle axes U. As may be seen, the jets are inclined at 45° with respect to the direction of advance D so that the laser spot S, as long as it moves within the working segment WB, cannot intercept them.

As may be noted in FIG. 8A, the working energy E, i.e., the energy of the laser spot L, is varied as a function of the position d along the working segment WB. The working energy E is high and constant in the fusion phase FS, whereas it is low and increasing in the pre-heating phase FP, and low and decreasing in the post-heating phase FR. The energy profile is determined on the basis of the characteristics of the material to be fused and in any case by carrying out a control of the temperature gradient generated according to what is required by the technological process that is to be implemented. The direction of advance D of the working process is represented opposite to the direction in which the internal trajectory lp is followed by the spot S, even though in general the laser S in other time intervals reverses its motion, moving backwards, and hence in the direction of advance D. In variant embodiments, a number of to and fro passes are performed over one and the same pre-heating, fusion, and post-heating segment.

Illustrated, instead, in FIG. 8B is the working segment WB in two successive instants t and t−1, as well as the two respective melt pools PM(t) and PM(t−1). As may be noted, the working segment WB, with the respective pre-heating, fusion, and post-heating phases, advances in the direction of advance D.

Represented in FIG. 9 is a working segment WB' which uses a laser spot S with a width that is the same as the width of the working segments WB' itself and hence coincides with the diameter of the melt pool PM. Consequently, it is necessary to get the diameter of the melt pool PM and the lateral dimension of the working segment WB, i.e., the pre-heating and post-heating segment, to coincide with the focusing diameter of the laser spot S by inclining accordingly the axes U of the nozzles 34 and adjusting the parameters of collimation of the laser spot S, via the adapter 22.

FIG. 9 shows, in a way similar to FIG. 8A, also the profile of the working energy E as a function of the position d, for the working segment WB' that uses a laser spot S with a width equal to that of working segment WB itself shown in the same figure. In this case, the internal trajectory lp provides that the laser spot performs a given sequence of displacements along the axis of the direction of advance D. It is in general provided that the internal trajectory lp may consist of to and fro movements along the axis of the direction of advance, even a number of times, varying the energy delivered at each pass. Also the melt pool PM can be displaced progressively along the working segment WB by varying the energy contribution between the passes.

Illustrated in FIGS. 8 and 9 are the working segments WB or WB', within which in general the powder-deposition point PD displaces linearly in the direction of advance D, drawn by the movement system 11 that drives the frame 30. The position in the horizontal plane of the powder-deposition point PD does not vary with the rotations about the frame axis ζ, and hence depends only upon the horizontal movement of the movement structure 11. Within the stretches WB or WB', as has been mentioned, internal trajectories 1p of the laser spot L are described to perform the phases of pre-heating, fusion, and post-heating. This in general applies to the working segments WB, which correspond to the sum of the three pre-heating, fusion, and post-heating zones, which are short and have a direction of advance D. The sum of these working segments WB, $WB_1$, $WB_2$, . . . that may have a direction of advance D that changes in time, determines working paths, which follow the powder-deposition path. As shown in FIG. 10, given a working path to obtain a given section of an object via fusion, it is provided to set a powder-emission path PP and a fusion path LP of the laser spot S focused on the working surface 110. In particular, according to what is indicated in FIG. 10, the powder-emission path PP and the laser fusion path LP are, in various embodiments, substantially congruous from a standpoint of the spatial co-ordinates. The laser fusion path LP and the powder-emission path PP can be followed by the frame 30 and by the optical scanner 20 simultaneously; i.e., the laser spot S and the deposition point PD are aligned, crossing in a working point. However, to carry out also pre-heating and post-heating, it is provided that the laser spot S is controlled to follow, according to the internal trajectory lp, with a given advance and a given delay that correspond to the positions d represented in the diagrams of FIGS. 8 and 9, the laser fusion path LP and the powder-emission path PP, respectively.

FIG. 11 shows a principle diagram of the architecture of a numeric-control unit 60 for managing control of the actuators, i.e., of the motors of the movement structure 11 that move the axes X, Y, Z of the moving element 12, of the motors that move the optical system 20, i.e., the galvanometric actuator for moving the axes of rotation θ and ω and the adapter 22 that controls the axis of translation α of the focusing point, hence of the vertical position of the spot S, as well as of the motor that drives rotation about the frame axis ζ of the frame 30 and/or the motors that control variation of the angle of inclination β. The unit 60 comprises two personal computers 61 and 62. The personal computer 61 operates as user interface for sending instructions and commands to the second personal computer 62, which preferably comprises an operating system 62a associated to real-time extensions 62b for management of the machine.

The operating system may, for example, be of a Linux or WinCE type, or be obtained via proprietary solutions. The personal computer 62 hence supplies the trajectories to be followed to a servo-control board 63 of a PCI DSP type for control of the actuators.

In the personal computer 62 and in the servo-control board 63 procedures of management of the axes of the laser machine 10 are implemented, in particular for management of the axes referred to above, X, Y, Z, α, θ, ω, ζ, β, as will be described in greater detail in what follows.

The numeric-control unit 60, according to procedures in themselves known in the art, generates a set of instructions P, corresponding to a so-called part program, for a "virtual" machine with given specifications of acceleration and velocity. This instruction set P comes from the personal computer 51 and is originated by a purposely provided program, for setting the trajectories and the movements of the machine offline. Applied to the latter is an interpolation function, which, on the basis of the instruction set P, generates a trajectory for the operating machine. This trajectory of the operating machine corresponds to the kinematic co-ordinates that describe in time the motion of a point of the operating machine, for example a joint or a tool centre point (TCP). This interpolation operates in response to a preparatory code, or G-code, sent within the instruction set P. The operation of interpolation is implemented via software within the personal computer 62.

It should be noted that, moreover, in the laser operating machine described, the unit 60 is configured for sending further commands regarding, for example, the flowrate of the jets of powder to be fused, the flowrate of the supporting gas, the characteristics of the laser radiation (power; mode: continuous, pulsed, etc.; possible frequency and duty cycle; shape of the radiation profile: Gaussian, top-hat, etc.), and the characteristics of the laser beam (diameter, focusing, etc.). These commands may be associated to the instruction set P so that they are issued in given points and at given instants defined by the trajectory of the operating machine.

The commands regarding the characteristics of the laser radiation and the characteristics of the laser beam can be controlled to regulate the thermal profile, for example by varying the power, and/or diameter, and/or focusing of the laser spot in the working segments WB of the path.

It is here again pointed out that, by trajectory defined according to given axes is meant, for example, a function of kinematic variables that correspond to said axes. Associated to the axes X, Y, Z are corresponding linear kinematic variables (displacements, velocities, accelerations), as well as to the axis of translation α, which determines displacement of the focus of the laser beam L, whereas associated to the axes of rotation θ, ω, ζ, β, are corresponding angular kinematic variables (angles of rotation, angular velocities, and angular accelerations).

The embodiments described of the machine 10 advantageously enable exploitation of the velocity and of the properties of focal control of the optical assembly 20 to deliver energy onto the zone where the laser thermal treatment has already been carried out, in particular the fusion zone, and the zone where the laser thermal treatment will be carried out.

The laser source, the optical scanner 21, and the adaptive collimator 22 control the energy applied on the segment of path for pre-fusion, i.e., for the pre-heating phase, and for post-fusion, i.e., for the post-heating phase. Since the variations of fusion path may lead to the situation where the laser during pre-heating and post-heating intercepts the powder jets before the powder-deposition point PD, or, even worse, intercepts the nozzles 34, with the machine described it is provided to rotate the frame 30 in order to follow the laser fusion path LP, formed by a plurality of working segments $WB_i$, so as to render the portions to be pre-heated and post-heated always accessible to pointing of the laser beam L and of the corresponding focusing spot S, as shown in FIG. 6.

Basically, according to what has been described, it is provided to use the laser operating machine 10 for additive manufacturing of objects by laser fusion following the steps below:

setting a powder-emission path PP for emitting, via said nozzles 34 in said frame 30, powders of a material to be fused onto the working surface 110 according to a powder-emission path PP;

setting a laser fusion path LP for sending, via said optical assembly 20, a focused spot S of a laser beam L according to a laser fusion path LP onto the powders emitted according to said powder-emission path PP to perform fusion thereof, said laser fusion path LP comprising displacement, according to the internal trajectory lp, of said spot S also to anticipate, in a pre-heating phase FP, or follow, in a post-heating phase FR, the powder-deposition point PD; and controlling actuators of the laser operating machine that are associated to axes of the machine via the numeric-control unit 60 and a servo-control module 63, to describe trajectories via respective axes in order to follow said laser fusion path LP and powder-emission path PP, wherein:

said operation of controlling actuators comprises an operating mode in which said actuators of said moving element 12 are controlled for moving said tool-carrier frame in a mobile way with respect to said optical assembly 20, rotating it at least about the vertical frame axis so ζ as to prevent the position of the nozzles 34 from intercepting the laser spot S controlled according to the laser fusion path LP and the internal trajectory lp.

In particular, the operation of controlling actuators provides rotating said frame 30 in such a way that all the axes U of the nozzles 34, or their projection on the working surface 110, at every moment do not intercept the direction of advance D of the working segment, and hence the aforesaid axes U or their projection forms an angle greater than zero with respect to the direction of advance D. The minimum angle of the axes U or their projection depends upon the size of the nozzles 34 and powder jets PJ and must be such that the laser beam does not interfere with them. The optimal condition that determines the angle between the nozzles 34 and the direction D to be used is that the bisectrix of the angle formed by the nozzles themselves should be tangential to the laser fusion path LP and hence to the direction D.

In particular, in the case of the frame 30 with four nozzles 34, at every moment the nozzle axes U form an angle of 45° with respect to the direction of advance D. In the case of two nozzles 34, the axes may be kept at 90°, whereas, in the case of eight nozzles, they may be kept at 22.5°; i.e., in general, the nozzle axes are kept at an angle equal to the flat angle divided by the number of the nozzles 34. On the other hand, these are optimal cases, the aim being to maximize the distance between the nozzle axes U and the direction of advance, whereas it is clear that in general the angle may even have lower values as long as the axis of the nozzle falling outside the powder-deposition point PD does not intercept the direction of advance D. In general, however, a deviation from the "optimal" angle, in the example an angle of 45°, could be required to anticipate a change of direction of fusion or avoid obstacles present in the working space (e.g., tools on which the workpiece is growing or parts already fused).

Moreover, in variant embodiments of the solution described herein, the laser operating machine may comprise a tool-carrier frame, arranged on which are the one or more nozzles for emitting jets of powder, where the nozzles are arranged on said frame in such a way that longitudinal axes thereof forms an angle of inclination with respect to said vertical axis such that jets of said nozzles intersect in a powder-deposition point, and the operating machine comprises actuator means for varying the angle of inclination β of the longitudinal axes of the one or more nozzles, but the frame undergoes movement according to axes different from rotation about a vertical axis described or else it is not actuated.

Hence, from what has been described, the solution presented and the corresponding advantages emerge clearly.

The laser operating machine according to the invention is able to operate in a flexible way thanks to the fact that the powder-emission nozzles are mobile with respect to the optical laser assembly according to a vertical axis. This is advantageous, in particular when the nozzles are very inclined on account of the presence of obstacles that need to be avoided, and hence the risk of interception is high; as a result, the possibility of inclining the nozzles prevents any interception during the steps of the process.

Of course, without prejudice to the principle of the invention, the details and embodiments may vary, even considerably, with respect to what has been described herein purely by way of example, without thereby departing from the sphere of protection. This sphere of protection is defined by the annexed claims.

In various embodiments, different strategies of use of the system described may be implemented in relation to the energy-control profile to be applied and to the application times, which are both linked to the type of powders, materials, and shapes to be treated thermally, namely, fused. In particular, as shown also in FIG. 8, the solution described enables application of the energy profile in a number of passes or using linear or zigzag or wobbling movements with a focused beam having a diameter smaller than the size of the powder-deposition spot PD or of the melt pool PM. This is possible by regulating the size and shape of the powder spot using the system for inclination of the nozzles and adjustment of the corresponding deposition flow and the focusing diameter of the laser spot S.

Alternatively, as shown in FIGS. 8 and 9, it will be possible to get the diameter of the melt pool and the lateral dimension of the pre-heating and post-heating segment to coincide with the focusing diameter of the laser spot S, via appropriate inclinations of the nozzles and adjustment of the parameters of collimation of the laser spot S.

The configuration of the laser assembly 20 moreover enables variation, during processing, of the focusing characteristics from one zone to another, and consequently it is possible to carry out fusion with a focused laser spot S with the same diameter as that of the welding pool and to use, instead, for applying energy in the pre-heating and post-heating segments, a de-focused laser beam that will intercept the working segment WB of interest with an appropriate diameter. The configuration of the laser assembly moreover enables application of energy in a controlled way using different rates of pass in the fusion, pre-heating, and post-heating segments.

As has been discussed above, the laser thermal treatment preferably carries out a laser fusion of the powders, but the machine and the method described herein also apply to laser sintering and to other laser thermal treatment processes compatible with the characteristics of the method and machine, as described and claimed.

The invention claimed is:

1. A laser operating machine for additive manufacture of objects, via a process of laser thermal treatment of metal powders, comprising a movement structure, which is mobile in a working space that comprises a working surface, said machine operating according to a first cartesian system of axes of movement and being configured for supporting a moving element that comprises nozzles for emitting jets of powder to be treated thermally, and an optical laser assembly for conveying a laser beam to form a laser spot focused on said working surface in order to carry out the laser thermal treatment on said powders, wherein said moving element comprises:
an upper portion fixedly associated to said movement structure, said optical laser assembly comprising optical-scanning means for positioning said laser spot in the working space, which operate positioning according to a respective set of axes of movement, comprising two axes of rotation of the axis of the laser beam incident on the working surface, which are perpendicular to one another, and an axis of translation of the laser spot along said axis, within respective limits on said set of axes of movement, and being set in said upper portion;
a lower portion, comprising a duct, on an end of said duct, which faces the working surface, is a tool-carrier frame, on which are arranged said nozzles for emitting the jets of powder, and said nozzles are arranged on said frame so that longitudinal axes of said nozzles form an angle of inclination with respect to a vertical axis of said first cartesian system of axes such that jets of said nozzles intersect in a powder-deposition point, said machine comprising actuator means for varying said angle of inclination of said longitudinal axes of said nozzles,
said optical laser assembly being set in the moving element so as to send the laser beam onto the working surface passing within a perimeter defined by said nozzles for emitting the jets of powder,
said optical laser assembly being configured for sending the laser beam through said duct and subsequently within the perimeter of the nozzles,
on said tool-carrier frame, which has a circular shape, the nozzles being fixed in a rotatable way, via rotation pins fixed on the frame, so as to be able to rotate about an axis tangential to the perimeter of the frame in such a way that only the angle of inclination with respect to the vertical axis is varied,
said actuator means comprising rotary actuators for rotating the nozzles about an axis tangential to the tool-carrier frame,
said optical laser assembly comprising optical-scanning means for positioning said laser spot in the working space, which operate according to a respective set of axes of movement,
the nozzles being arranged on said frame so that the nozzles define a passage area of said perimeter defined by the nozzles for the laser beam with a size which varies with said angle of inclination, a rotation including at least a position in which the nozzles intercept the laser beam positioned by said optical-scanning means within said respective limits on said set of axes of movement, a numeric-controlled unit being configured to vary said angle of inclination of said longitudinal axes of said nozzles so that the numeric-controlled unit prevents the position of the nozzles from intercepting the laser spot controlled according to a laser thermal-treatment path and an internal trajectory, and said lower portion is configured for rotating said frame about a frame axis parallel to the vertical axis, said numeric-controlled unit being configured to control said actuators of said moving element for moving said tool-carrier frame in a mobile way with respect to said optical laser assembly, rotating said frame in such a way that all the axes of the nozzles, or the axes projection on the working surface, at every moment do not intercept a direction of advance of a working segment along the laser thermal-treatment path.

2. The machine according to claim 1, wherein said actuator means comprise a first ring, hinged on which is each of the nozzles, and a second ring, mobile in a vertical direction, which comprises a respective rotation pin engaged in a slot made on each of the nozzles.

3. The machine according to claim 2, wherein said first ring and said second ring are circular and concentric and said second ring has a larger diameter than said first ring.

4. The machine according to claim 1, wherein said tool-carrier frame and said arrangement of the nozzles identify a circular perimeter.

5. The machine according to claim 1, wherein said nozzles comprise nozzles for spraying supporting gas or nozzles for spraying a protecting process gas.

6. The machine according to claim 1, wherein said optical-scanning means comprise two orienting mirrors for orienting the laser beam in a conical space defined by said two axes of rotation, and an adaptive-collimation element for varying the diameter and a focusing point of the laser spot along said axis of translation and the focusing diameter of said laser spot within said conical space, and a stationary mirror that directs towards the orienting mirrors the laser beam coming from the adaptive-collimation element.

7. The machine according to claim 1, wherein a laser source for the process of laser thermal treatment is co-located with a collimation and scanning system.

8. A method for additive manufacture of objects, via a process of laser thermal treatment of metal powders, using a laser operating machine for additive manufacture of objects, via the process of laser thermal treatment of metal powders, comprising a movement structure, which is mobile in a working space that comprises a working surface, said machine operating according to a first cartesian system of axes of movement and being configured for supporting a moving element that comprises nozzles for emitting jets of powder to be treated thermally, and an optical laser assembly for conveying a laser beam to form a laser spot focused on said working surface in order to carry out the laser thermal treatment on said powders, said moving element comprising:

an upper portion fixedly associated to said movement structure, said optical laser assembly comprising optical-scanning means for positioning said laser spot in the working space, which operate positioning according to a respective set of axes of movement, comprising two axes of rotation of the axis of the laser beam incident on the working surface, which are perpendicular to one another, and an axis of translation of the laser spot along said axis, within respective limits on said set of axes of movement, and being set in said upper portion;

a lower portion, comprising a duct, on an end of said duct, which faces the working surface, is a tool-carrier frame, on which are arranged said nozzles for emitting the jets of powder, and said nozzles are arranged on said frame so that longitudinal axes of said nozzles form an angle of inclination with respect to a vertical axis of said first cartesian system of axes such that jets of said nozzles intersect in a powder-deposition point, said machine comprising actuator means for varying said angle of inclination of said longitudinal axes of said nozzles, said optical laser assembly being set in the moving element so as to send the laser beam onto the working surface passing within a perimeter defined by said nozzles for emitting jets of powder, said optical assembly being configured for sending the laser beam through said duct and subsequently within the perimeter of the nozzles, on said tool-carrier frame, the nozzles being fixed in a rotatable way, via rotation pins fixed on the frame, so as to be able to rotate about an axis tangential to the perimeter of the frame in such a way that only the angle of inclination with respect to said vertical axis is varied, said actuator means comprising rotary actuators for rotating the nozzles about an axis tangential to the tool-carrier frame, said optical laser assembly comprising optical-scanning means for positioning said laser spot in the working space, which operate according to a respective set of axes of movement, the nozzles are arranged on said frame so that the nozzles define a passage area of said perimeter defined by the nozzles for the laser beam with a size which varies with said angle of inclination, said rotation of the nozzles including at least a position in which the nozzles intercept the laser beam positioned by said optical-scanning means within said respective limits on said set of axes of movement, said method comprising:

setting a powder-emission path for emitting via said nozzles in said frame powders of a material to be treated thermally on the working surface according to the powder-emission path;

setting a laser thermal-treatment path for sending, via said optical laser assembly, a focused spot of a laser beam according to the laser thermal-treatment path onto said powders emitted according to said powder-emission path to perform the laser thermal treatment of said powder-emission path, said laser thermal-treatment path comprising moving, according to an internal trajectory, said spot also to anticipate, in a pre-heating phase, or to follow, in a post-heating phase, the point of deposition of said powders in which a step of thermal treatment is carried out;

arranging said nozzles on said frame so that longitudinal axes of said nozzles form an angle of inclination with respect to said vertical axis such that jets of said nozzles intersect in a powder-deposition point;

controlling actuators of the laser operating machine that are associated to axes of the machine via a numeric-control unit and a servo-control module to describe trajectories via respective axes in order to follow said laser thermal-treatment path and said powder-emission path, wherein said operation of controlling actuators comprises an operating mode in which said actuators of said moving element are controlled for varying the angle of inclination of said nozzles, and said lower portion rotating said frame about a frame axis parallel to said vertical axis, said operation of controlling actuators of said moving element for moving said tool-carrier frame in a mobile way with respect to said optical assembly, comprising rotating said frame in such a way that all the axes of the nozzles, or the axes projection on the working surface, at every moment do not intercept a direction of advance of a working segment along the laser thermal-treatment path.

9. The method according to claim 8, wherein varying said angle of inclination of said longitudinal axes of said nozzles prevents the position of the nozzles from intercepting the laser spot controlled according to the laser thermal-treatment path and the internal trajectory.

10. The method according to claim 9, wherein varying said angle of inclination of said longitudinal axes of said nozzles for satisfying one or more of the following conditions:

avoiding obstacles present in the working space;
varying the shape of the powder-deposition point; and
varying the height of the powder-deposition point.

11. The method according to claim 8, wherein said operation of controlling actuators comprises an operating mode in which said actuators of said moving element are controlled for moving said tool-carrier frame in a way mobile with respect to said optical assembly, by rotating said tool-carrier frame at least about the frame axis, so as to prevent the position of the nozzles from intercepting the laser spot controlled according to the laser thermal-treatment path and the internal trajectory.

* * * * *